April 25, 1961     A. F. DE FELICE     2,981,264
DENTAL CLEANER MASSAGER
Filed June 22, 1959

AURELIUS F. DE FELICE
INVENTOR.

BY *Rodger H. Alleman*
ATTORNEY

United States Patent Office 2,981,264
Patented Apr. 25, 1961

2,981,264

DENTAL CLEANER MASSAGER

Aurelius F. De Felice, 126 Melrose Ave., San Francisco 17, Calif.

Filed June 22, 1959, Ser. No. 822,036

2 Claims. (Cl. 132—91)

This invention relates generally to dental cleaning devices and is more specifically directed to a device for cleansing the teeth and stimulating and cleaning the gums.

Previously known oral hygiene devices are limited in most instances to coarse or abrasive materials which are applied to the surface of the teeth, either alone, or in cooperation with cleansing compounds. This system, exemplified by the well known tooth brush and paste, usually leaves large particles of food and foreign matter in the hard-to-reach interstices between the teeth. Additionally, the hard bristles often employed inflame and even lacerate the tender gingiva or gum areas, and it is a common complaint of persons who attempt to take good care of their teeth that they suffer from bleeding or extremely tender gums. With this invention it becomes possible to use soft bristles in place of hard bristle tooth brushes and yet get more effective cleaning and massage action.

The critical or most difficult to clean areas of the mouth are between the teeth near the gum line, and bacteria from foreign decaying particles left in this region often invade the weakened gum area to cause serious dental problems. This is often complicated by the fact that, other than occasional bleeding gums, the victim of oral disease rarely realizes that infection has spread from the gum line to the root area of the teeth until it is too late to save them.

It has long been realized that the gums can be strengthened and kept healthy by gentle massaging action. It has been difficult, however, to effectively reach the small hidden area of the gums between the teeth that are so susceptible to trouble.

It is therefore a primary object of this invention to provide a means for effectively cleaning the area between the teeth while simultaneously massaging the critical area of the gums located between and around the teeeth.

Another object of this invention is to provide a means for massaging and strengthening the gum area and especially the inner surface area behind the teeth, which is difficult or impossible to reach by heretofore available devices.

Another object of my invention is to provide a means for improving the circulation of blood in hidden areas between the teeth while providing a gentle rocking action for the teeth themselves.

A further object of this invention is to provide a teeth cleaning and gum massaging device that may be inexpensively manufactured, easily used, and readily discarded after use.

With these and other objects in mind my invention will now be more specifically described in connection with the accompanying drawings wherein.

Figures 1, 2:
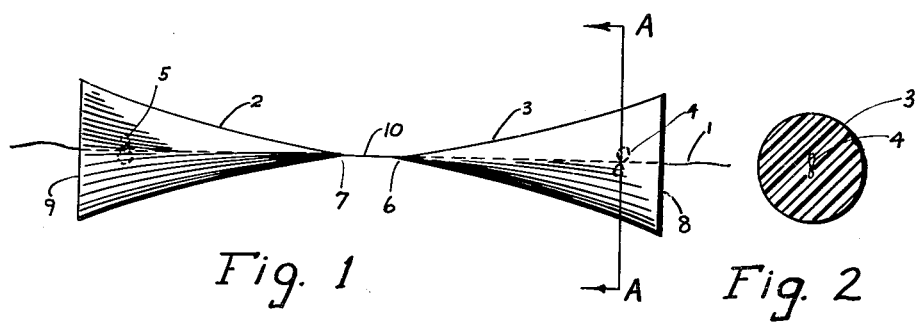
Figure 1 is a side elevational view of a preferred modification of the invention.
Figure 2 is a sectional representation taken on A—A of Figure 1.

Referring first to Figure 1, the preferred modification of the invention will be seen to consist of a thin, strong, stringlike floss member 1 upon which are securely mounted two similarly shaped massager cones 2 and 3. Floss 1 may be of any material of high tensile strength that will withstand the temperature of sterilization or the chemical action of sterilants without losing its strength. Such material is commonly available and is preferably nylon, Orlon, or common dental floss which is formed of many fibers or elements, unbraided, to facilitate its easy insertion and removal between the teeth.

Mounted upon floss 1 are the massager cones 2 and 3 which are preferably formed of an elastomeric material which bonds readily to the fibers of floss 1. Such a bond may be chemical or mechanical and the latter attachment, especially is facilitated by a knot 4 in massager cone 3 and 5 in massager 2. A firm yet non-rigid material that has been found to be especially suitable is a silicone rubber compound denoted PR 1930 manufactured by the Product Research Company.

In this preferred embodiment the massager cones 2 and 3 are mounted in spaced relation on floss 1 and are placed at least one quarter of an inch apart. Cones 2 and 3 are preferably circular in cross section as shown in Figure 2. However, a consideration of the side view of Figure 1 will reveal that the curved outer surfaces of the cones do not slope constantly from tips 6 and 7 to bases 8 and 9, respectively, but are generally concave to provide a sharper, narrowed portion for easier insertion between the teeth.

In operation, the cleaner massager is grasped with one end of floss 1 in each hand, preferably wrapped around a finger of each hand, and the central portion 10 is slipped between two teeth. The device is then oscillated longitudinally between the teeth so that the tips 6 and 7 of the massager cones 2 and 3 alternately enter into the space between the teeth thus giving a penetration from both the front and back of the teeth. As a tip of cone 3, for example, enters the area between the teeth the sharp portion aids in prying away any foreign matter loosened by the action of the floss. In addition, a massaging pressure is simultaneously exerted upon the gingival area immediately surrounding the space between the teeth. This massaging pressure acts upon pockets of blood under the surface of the gum, squeezing it out, while exercising the gum and increasing beneficial circulation which aids in preventing infection.

Additionally, the action of the floss and massager cones will cause a slight and gentle movement extending to the roots of the teeth, within the alveolar tissue in which they are embedded, which also has a stimulating and beneficial effect.

Although two massager cones have been shown in connection with floss 1 in Figures 1 and 2, it should be understood that any number of such cones may be placed upon a floss element 1, preferably with each pair at substantial distance from each other to aid in providing a gripping area for holding the device. Likewise it may be desirable to have a plurality of massager cones mounted on a floss element in which the tip portions all face in the same direction.

Figures 3, 4:
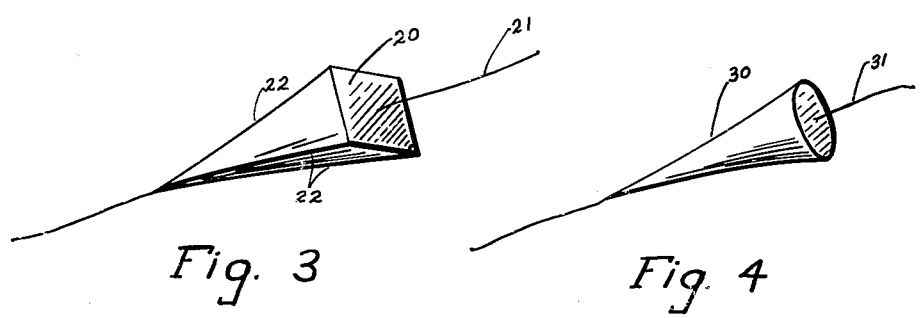
Figure 3 is an isometric view of one modification of the invention.
Figure 4 is a second modification of the invention also shown in three dimensions.

Figure 3 shows a second modification of the invention in which a massager cone 20 is mounted upon a floss element 21 in a like manner as described in connection with Figure 1. In this modification, massager cone 20 is substantially square in cross section and the edges 22 are preferably concave. This embodiment provides an increased loosening action due to the irregularity of the massaging surface. Other polygonal cross sectional configurations may also be used to advantage when an increased massaging effect is desired.

In Figure 4 I have provided a third modification of the invention in which a massager cone 30 is mounted upon a floss 31. Cone 30 is elliptical in cross section and is rather flat in appearance. This flat configuration aids in penetrating farther into the area between the teeth, especially when the teeth are very close together.

My invention may be easily manufactured by placing floss elements, preferably knotted, into molds, shaped in the desired configuration, and molding massager cones therearound, thus lending itself to be mass produced by conventional modern techniques.

Thus, my invention provides an inexpensive and effective means of dislodging foreign particles from between the teeth while simultaneously massaging the gums and the teeth, in this way promoting healthy dental conditions, especially in the hard-to-reach areas affected by this invention.

While certain preferred embodiments of the invention have been specifically disclosed, it is understood that the invention is not to be limited thereto as many variations will be readily apparent to those skilled in the art and the invention is to be given the broadest interpretation within the terms of the following claims.

I claim:

1. An oral hygiene device comprising a flexible elongated multi-fiber floss adapted to be easily slipped into the space between two teeth, and at least one pair of resilient massager means coaxially secured upon said floss for simultaneously cleaning and massaging the gingival area surrounding the space between said teeth as said elongated floss is longitudinally reciprocated, said massager means comprising resilient elastomeric cones, which cones are spaced apart in mirror relationship on said floss, the apex ends of said cones terminating in cross sectional dimensions which are substantially the same as the dimensions of said floss.

2. An oral hygiene device as claimed in claim 1 in which said multi-fiber floss contains a pair of knots, and in which said massager cones are respectively, bonded to and around said knots along their entire longitudinal axis.

References Cited in the file of this patent

UNITED STATES PATENTS

| | | |
|---|---|---|
| 1,069,874 | Hanscom | Aug. 12, 1913 |
| 1,559,320 | Hirsh | Oct. 27, 1925 |
| 1,608,212 | Hochstadter | Nov. 23, 1926 |
| 2,180,522 | Henne | Nov. 21, 1939 |
| 2,788,000 | Lather | Apr. 9, 1957 |
| 2,827,045 | Diener | Mar. 18, 1958 |